United States Patent Office 3,130,192
Patented Apr. 21, 1964

3,130,192
AZEPINES AND N-AMINOALKYL
DERIVATIVES THEREOF
Walter Schindler, Riehen, near Basel, Switzerland,
assignor to Geigy Chemical Corporation, Ardsley, N.Y.
No Drawing. Filed Aug. 10, 1962, Ser. No. 216,046
Claims priority, application Switzerland Nov. 13, 1956
15 Claims. (Cl. 260—239)

In a first aspect thereof, the present invention concerns new azepines which are valuable starting materials for the synthesis of therapeutics, as well as a process for the production of these azepines.

5-dibenzo[b,f]azepines and derivatives thereof were not known prior to the present invention. According to the latter, such compounds of the general formula:

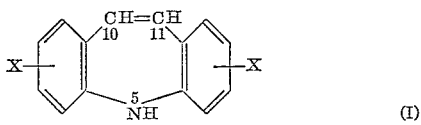
(I)

wherein X represents hydrogen, a halogen atom or the methyl group and which will be termed iminostilbenes in the following, can be produced in good yields by converting a 10,11-dihydro-5-dibenzo[b,f]azepine (iminodibenzyl) of the general formula:

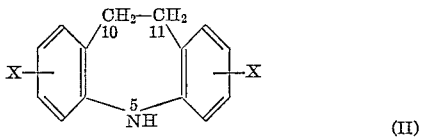
(II)

into a 5-acyl derivative which is easy to split, reacting this with a compound giving off halogen, in particular N-bromo-succinimide and treating the 5-acyl-10-halogen-10, 11-dihydro-5-dibenzo[b,f]azepine so obtained which may be substituted as defined, with an agent splitting off hydrogen halide and simultaneously or subsequently hydrolysing.

Apart from iminodibenzyl, suitable starting materials of the general Formula II are, for example, 3,7-dichloro-iminodibenzyl, 2,8-dichloro-, 1,9-dichloro-, 3,7-dimethyl-, 2,8-dimethyl- and 1,9-dimethyl-iminodibenzyl. These compounds can be obtained from the corresponding diamino-dibenzyls by heating their monohydrochlorides or phosphates or by heating the bases with polyphosphoric acid. To convert into the easily split 5-acyl derivatives, the iminodibenzyls named can be reacted for example with acetyl chloride, chloroformic acid methyl ester or ethyl ester while heating. N-bromosuccinimide is excellently suitable as compound giving off halogen; also N-chlorosuccinimide, N-bromophthalimide and N-bromoacetamide can be used. The splitting off of hydrogen halide and the hydrolysis can be performed, for example, in one step by means of alkali lye while heating. On treating the 5-acyl-10-halogen-iminodibenzyls with a tertiary organic base such as e.g. collidine, while heating or on reacting with an alkali lye in the cold, the 5-acyl-iminostilbenes are first obtained. These can also be hydrolysed with alkali lye while heating.

The iminostilbenes (I) produced according to this aspect of the present invention can be substituted in the imino group in many ways. For example, compounds having valuable antiallergic and psychoplegic properties are obtained, such as 5-($\beta$-dimethylamino-ethyl)-, 5-($\beta$-dimethyl-amino-propyl)-, 5-($\gamma$-dimethylamino-propyl)- and 5-($\beta$-pyrrolidino-ethyl)-iminostilbene, if the sodium compound from iminostilbene and sodium amide or the lithium compound obtained with lithium amide is reacted with the corresponding dimethylamino alkyl halides or with $\beta$-pyrrolidino ethyl halides.

The following examples further illustrate the production of the new compounds (I). Parts are given as parts by weight and their relationship to parts by volume is as that of grammes to cubic centimeters. The temperatures are in degrees centigrade.

Example 1

(a) 100 parts of iminodibenzyl are refluxed with 300 parts of acetyl chloride until a complete solution is obtained. The excess acetyl chloride is then distilled off and the residue is poured into benzine whereupon the 5-acetyl-iminodibenzyl crystallises out. It is recrystallised from a little alcohol. M.P. 98°.

(b) 45 parts of 5-acetyl-iminodibenzyl and 33.8 parts of bromosuccinimide in 400 parts by volume of carbon tetrachloride are refluxed in a strong light while stirring. As soon as the bromosuccinimide which at first lies on the bottom of the flask has disappeared and the succinimide has formed a layer on top of the liquid, the whole is cooled and the separated succinimide is drawn off under suction. The carbon tetrachloride solution is washed with water and the solvent is distilled off in the vacuum at a bath temperature of 60°. The crude 10-bromo-5-acetyl-iminodibenzyl so obtained is heated with four times the amount of collidine for 5 hours at 140–150°. The collidine hydrobromide which precipitates after this time is filtered off under suction and the collidine is completely evaporated off in the vacuum. The residue is taken up in a lot of ether, thoroughly washed with 2 N-hydrochloric acid and water, dried and concentrated into a small volume whereupon the 5-acetyl-iminostilbene crystallises out. It is filtered off under suction, recrystallised from a lot of ether; M.P. 117–119°.

5-acetyl-iminostilbene is also obtained by dissolving 30 parts of the crude brominating product mentioned above in 120 parts by volume of abs. alcohol and adding 12 parts of 50% potash solution. The potassium bromide begins to separate immediately. It is left to stand for 2 hours, then about 170 parts of water are added and the whole is stirred until crystallisation. The 5-acetyl-iminostilbene is filtered off under suction, washed neutral first with water and then finally with ice-cooled ether.

(c) 5 parts of 5-acetyl-iminostilbene are refluxed with a solution of 3 parts of caustic potash in 2 parts of water and 15 parts by volume of 96% alcohol for 18 hours. The solution is then poured into water, the orange colored crystals are filtered off under suction and recrystallised from a lot of alcohol. The iminostilbene melts at 206–208°.

The same compound is obtained if 5 parts of crude brominating product are refluxed for 18 hours while stirring with 6 parts of caustic potash, 4 parts of water and 30 parts by volume of 96% alcohol. The solution is then poured into water and the iminostilbene is filtered off under suction.

Example 2

(a) 57 parts of iminodibenzyl are dissolved in 400 parts of abs. benzene and a suspension of 12 parts of sodium amide in toluene is added dropwise at 60–70°. On completion of the dropwise addition, the whole is boiled for 2 hours while introducing nitrogen. It is then cooled to 20° and 33 parts of chloroformic acid ethyl ester is slowly added dropwise. The temperature rises to 30–35°. The reaction mixture is then refluxed for 5 hours, cooled and water is added. The benzene phase is removed, thoroughly washed with water, dried and concentrated. The residue is recrystallised from ether/petroleum ether. The 5-carbethoxy-iminodibenzyl melts at 95°.

(b) 27 parts of this 5-acyl derivative in 200 parts by volume of carbon tetrachloride are refluxed for 4 hours in a good light with 18 parts of bromosuccinimide. After this time, the reaction mixture is cooled and the succinimide which has precipitated is filtered off under suction. The carbon tetrachloride solution is washed with water and completely evaporated in the vacuum at a bath temperature of 60°. To purify the residue, it is taken up in 400 parts by volume of benzine, filtered and concentrated. 45 parts of an oil remains which is 10-bromo-5-carbethoxy-iminodibenzyl.

(c) 24 parts of the crude bromine compounds are dissolved in 60 parts by volume of alcohol and 10 parts of a 50% potash lye are added whereupon the temperature rises to 40°. The whole is left for one hour at room temperature, then cooled to —5° and the crystals which have precipitated are filtered off under suction. They are washed first with a little alcohol and then with water until they are free of ions and then dried. 5-carbethoxy-iminostilbene melts at 126–127°.

(d) 5 parts of 5-carbethoxy-iminostilbene are refluxed for 20 hours with a solution of 3 parts of caustic potash, 1 part of water and 15 parts by volume of alcohol. It is cooled to room temperature, the iminostilbene which is in the form of orange colored leaflets is filtered off under suction and washed thoroughly with water.

The iminostilbene is also obtained if 5 parts of the crude bromine compound are refluxed for 20 hours with 10 parts of caustic potash, 2 parts of water and 30 parts by volume of alcohol.

*Example 3*

(a) 26 parts of 3,7-dichloro-iminodibenzyl are boiled in 300 parts by volume of benzene and 110 parts of acetyl chloride are added dropwise within 2 hours. The reaction solution is then refluxed for 4 hours. The solvent and excess acetyl chloride are then evaporated off in the vacuum and the residue is recrystallised from alcohol. 5-acetyl-3,7-dichloro-iminodibenzyl melts at 147–148°.

(b) 53 parts of 5-acetyl-3,7-dichloro-iminodibenzyl and 37 parts of bromosuccinimide are boiled in 500 parts by volume of carbon tetrachloride under good lighting until the succinimide is in a layer on top of the liquid, which is about for 2½ hours. The mixture is cooled, filtered off from the succinimide under suction and the carbon tetrachloride is completely evaporated off in the vacuum.

The residue is dissolved in 150 parts by volume of alcohol and 25 parts of 50% potash lye are added. After standing for half an hour, 150 parts by volume of water are added, the crystals of 5-acetyl-3,7-dichloro-iminostilbene are filtered off under suction, washed with a little cold alcohol and dried. M.P. 184–185°.

(c) 42.2 parts of 5-acetyl-3,7-dichloro-iminostilbene and 26 parts of potassium hydroxide in 130 parts by volume of abs. alcohol are refluxed for 4 hours. After this time, the reaction mixture is cooled, and the crude 3,7-dichloro-iminostilbene is filtered off. It is washed first with alcohol, then thoroughly with water and recrystallised from ether. M.P. 282–284°.

In a second aspect thereof, the present invention is concerned with new basically alkylated azepines having valuable pharmacological properties as well as a process for the production thereof.

According to this aspect of the invention, N-substituted iminostilbenes of the general formula:

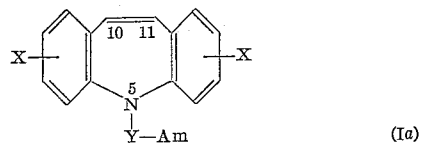

(Ia)

wherein

X represents hydrogen, a halogen atom or the methyl group,

Y represents an alkylene radical having 2–6 carbon atoms and 2–4 bridging members between N and Am, and Am represents a low molecular dialkylamino radical, wherein both alkyl radicals may be joined to form a saturated N-hetero ring, having valuable pharmacological properties, in particular antiallergic and sedative activity and can be used, among other purposes, for the treatment of certain forms of mental disorders, in particular mental depressions.

Quaternary ammonium salts which are derived from the tertiary bases defined above can be used as gangliopegica.

The new compounds Ia are produced by reacting an iminostilbene (according to the first aspect of this invention) of the general formula:

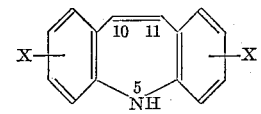

(I)

in the presence of an acid binding agent, with a reactive ester of an amino alcohol of the general formula:

$$HO—Y—Am \qquad (III)$$

wherein X, Y and Am have the meanings given above.

Sodium amide, lithium amide, potassium amide, sodium, lithium or potassium are particularly suitable as acid binding agents. Particularly the halides are used as reactive esters of amino alcohols of the general Formula III. Individually can be named:

Dimethylaminoethyl chloride, diethylaminoethyl chloride, methylethylaminoethyl chloride, pyrrolidinoethyl chloride, piperidinoethyl chloride, β-dimethylaminopropyl chloride, β-dimethylaminoisopropyl chloride, γ-dimethylaminopropyl chloride, δ-dimethylaminobutyl chloride, α-methyl-γ-dimethylamino-n-amyl chloride, β-(di-n-propylamino)-ethyl chloride, β-methylisopropylaminoethyl chloride, β-(di-n-butylamino)-ethyl chloride and β-(di-isobutyl-amino)-ethyl chloride or the corresponding bromides and iodides.

Apart from iminostilbene, suitable iminostilbenes for the reaction are for example 3,7-dichloro-iminostilbene, 2,8-dichloro-iminostilbene, 1,9-dichloro-iminostilbene, 3,7-dibromo-iminostilbene, 3,7-dimethyl-iminostilbene and 2,8-dimethyl-iminostilbene. These starting materials are obtained from the corresponding iminodibenzyl compounds by converting them into N-acyl derivatives which are easy to split, halogenating, for example with bromosuccinimide, splitting off hydrogen halide, and hydrolysis, e.g. by means of alkali metal hydroxides in the cold.

The new N-substituted iminostilbenes of the general formula Ia can also be produced by reacting, if necessary in the presence of an acid binding agent, an iminostilbene of the general Formula I with phosgene, reacting the 5-chlorocarbonyliminostilbene obtained with an amino alcohol of the general Formula III and heating the obtained 5-(carbo-aminoalkoxy)-iminostilbene of the general formula:

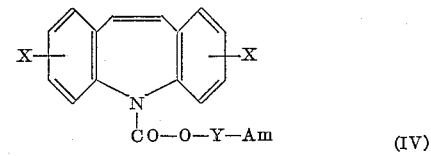

(IV)

until carbon dioxide is split off.

A third process for the production of compounds of the general Formula Ia consists in reacting a reactive ester of a compound of the general formula:

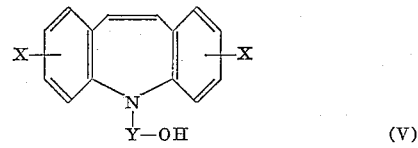

(V)

wherein X and Y have the meanings given above, in particular a halide, with a secondary amine of the general formula:

$$Am-H \qquad (VI)$$

wherein Am has the meaning given above. The reaction can be performed for example at a moderately raised temperature of e.g. 80–120° in an inert solvent such as e.g. a low molecular alkanol or alkanone. It is of advantage to employ an excess of the amine used in the reaction as acid binding agent. Depending on the boiling point of the amine and solvent used as well as on the temperature necessary, the reaction must sometimes be performed in a closed vessel. Reactive esters of compounds of the general Formula V are obtained, for example, by reacting alkali metal compounds of iminostilbenes of the general Formula I with alkylenoxides and reacting the 5-hydroxyalkyl-iminostilbenes obtained with inorganic acid halides, methane sulphonic acid chloride or aryl sulphonic acid chlorides. 5-halogen alkyliminostilbenes or 5-aryl sulphonyloxy-alkyl-iminostilbenes are thus obtained. These can be reacted, for example, with dimethylamine, methylethylamine, diethylamine, di-n-butylamine, pyrrolidine or piperidine.

Compounds of the general Formula Ia are obtained according to a further process by reacting a compound

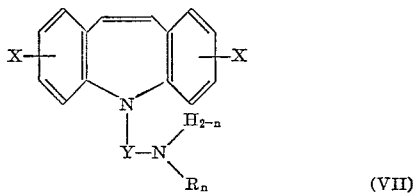

wherein

R represents a low molecular alkyl radical,
n represents the number 1 or 0, and
X and Y have the meanings given above, with a low molecular alkylating agent. Starting materials of the general Formula VII are obtained, for example, if, analogous to the immediately preceding process, instead of a secondary amine of the general Formula VI, ammonia or a low molecular monoalkylamine is reacted with a reactive ester of a compound of the general Formula V. They are also obtained for example by reduction or hydrogenation of a 5-cyanoalkyl-iminostilbene. Examples of low molecular alkylating agents in the presence of acid binding agents such as e.g. sodium or potassium carbonate, and an inert organic solvent, are: dimethyl sulphate, diethyl sulphate, diethyl sulphate, methyl iodide, ethyl iodide, ethyl bromide, n-propyl bromide and p-toluene sulphonic acid methylester; also for example formaldehyde in the presence of formic acid.

Finally compounds of the general Formula Ia can also be produced by reacting compounds of the general formula:

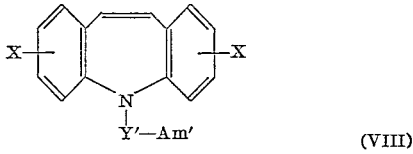

wherein Y' and Am' correspond to the definitions given for Y and Am above, but in at least one of the two radicals at least one methylene group bound to a nitrogen atom is replaced by a carbonyl group —CO—, and X has the meaning given above, with an alkali metal-earth metal hydride, in particular with lithium aluminum hydride. This process is of importance in particular for the production of N',N' - disubstituted 5 - (α - aminomethylalkyl)-iminostilbenes because according to the first process mentioned above for example, these compounds are only obtained in admixture with the isomeric N',N'-disubstituted 5-(β-amino-alkyl)-iminostilbenes formed by rearrangement. The N',N' - disubstituted t - (α - carbamylalkyl)-iminostilbenes necessary for the production of the above compounds are obtained for example by reacting alkali metal compounds of iminostilbenes of the general Formula I with low molecular α-bromo-alkane carboxylic acid dialkyl amides, pyrrolidides or piperidides. Other starting materials of the general Formula VIII are, for example, the 5-dialkylaminoalkanoyl and 5-piperidino alkanoyl iminostibenes, 5-(N'-alkyl-aikanoylaminoalkyl)-iminostilbenes, 5-(N',N'-dialkanoylaminoalkyl)-iminostilbenes, 5-succinimidoalkyl-iminostilbenes and 5-glutarimidoalkyl-iminostilbenes. The first group of compounds named is obtained for example by reacting alkali metal compounds of iminostilbenes of the general Formula II with halogen alkane carboxylic acid halides and then reacting the 5-halogen alkanoyl-iminostilbenes obtained with low molecular dialkylamines, pyrrolidine or piperidine. The other starting materials mentioned are obtained for example by reacting reactive esters of compounds of the general Formula V with alkali metal compounds of alkane carboxylic acid-N-alkylamides, succinimide or glutarimide or by acylating 5-monoalkylaminoalkyl-iminostilbenes or 5-aminoalkyl-iminostilbenes corresponding to the general Formula VII.

Monoquaternary ammonium compounds are obtained from the tertiary amines of the general Formula Ia in the usual way, by adding halides or sulphates of aliphatic or araliphatic alcohols to the tertiary amines, e.g. methyl iodide, dimethyl sulphate, ethyl bromide, ethyl iodide or benzyl chloride.

The tertiary bases form salts with inorganic or organic acids such as hydrochloric acid, hydrobromic acid, sulfuric acid, phosphoric acid, methane sulphonic acid, ethane disulphonic acid, acetic acid, citric acid, malic acid, succinic acid, tartaric acid, benzoic acid and phthalic acid. Some of these salts are water-soluble. Fumaric and maleic acid may also be named.

The following examples further illustrate the production of the new compounds Ia. Parts are given as parts by weight and their relationship to parts by volume is as that of grammes to cubic centimeters. The temperatures are in degrees centigrade.

*Example 4*

3.86 parts of iminostilbene are dissolved in 50 parts by volume of abs. benzene and a benzene solution of the base liberated from 5 parts of γ-dimethylaminopropyl chloride hydrochloride is added and the whole is heated to 60–70°. A suspension of 11 parts of sodium amide in toluene is added dropwise within half an hour and the whole is then refluxed for 18 hours. The reaction mixture is cooled and water is added. The benzene layer is separated, washed twice with water and then extracted three times with 50 parts of 2 N-acetic acid each time. The acetic acid extracts are combined, the combination is made alkaline with alkali lye and it is then ethered out. The ether extract is dried over sodium sulphate, the solvent is distilled off and the residue is distilled in the high vacuum. The 5-(γ-dimethylamino-propyl)-iminostilbene passes over at 163–165° under 0.006 mm. pressure. It crystallises on standing for a long time and after recrystallisation from pentane, it melts at 56–57°. The hydrochloride produced with alcoholic hydrochloric acid melts at 176–177°.

On using the base liberated from 5.4 parts of β-pyrrolidino-ethyl chloride-hydrochloride, 5 - (β - pyrrolidinoethyl)-iminostilbene is obtained. It boils at 172–175° under 0.001 mm. pressure and, recrystallised from pentane, melts at 74–74.5°. Its hydrochloride melts at 195–196°.

In the same way, 5-(β-dimethylamino-propyl)-iminostilbene (B.P.$_{0.02}$ 151–153°) is obtained from the base liberated from 5 parts of β-dimethylamino-propyl chloride-hydrochloride, 5-(β-diethylamino-ethyl)-iminostilbene (M.P. 53°) is obtained from the base liberated from 5 parts of β-diethylamino-ethyl chloride-hydrochloride, and 5-(β,β-dimethyl-γ-pyrrolidino)-iminostilbene (B.P.$_{0.02}$ 169°) is obtained from the base liberated from 7 parts of β,β-dimethyl-γ-pyrrolidino-propyl chloride-hydrochloride.

Also, on replacing the iminostilbene in the above example by 4.55 parts of 3,7-dichloro-iminostilbene or by 4.14 parts of 3,7-dimethyl-iminostilbene and otherwise proceeding in the same manner, 5-(γ-dimethylamino-propyl)-3,7-dichloro-iminostilbene (M.P. 76–77°) or 5-(γ-dimethylamino-propyl)-3,7-dimethyl-iminostilbene respectively is obtained.

In an analogous manner, 5-(β-dimethylamino-ethyl)-3,7-dichloro-iminostilbene (M.P. 95–96°) is obtained from 4.55 parts of 3,7-dichloro-iminostilbene with the base liberated from 4.6 parts of β-dimethylamino-ethyl chloride-hydrochloride. 5-(γ-dimethylamino-propyl)-3,7-dibromo-iminostilbene and 5-(β-pyrrolidino-ethyl)-2,8-dibromo-iminostilbene are obtained in an analogous manner.

Example 5

28 parts of 5-chlorocarbonyl-iminostilbene (produced from iminodibenzyl and phosgene) in 50 parts by volume of abs. benzene are added dropwise within one hour to 25 parts of 2-dimethylamino-propanol. On completion of the dropwise addition, the reaction mixture is refluxed for 16 hours. It is then cooled and water is added. The benzene phase is separated, thoroughly washed with water and the basic portions are extracted with 2 N-hydrochloric acid. The acid solution is made alkaline with potassium carbonate solution and ethered out. After drying, the solvent is distilled off. The residue is crude 5-(β-dimethylamino-carbopropoxy)-iminostilbene.

30 parts of the crude product obtained above are heated in an oil bath at 230–240° for about 6 hours until the development of carbon dioxide has been completed. The residue is then distilled in a high vacuum whereupon 5-(β-dimethylamino-propyl)-iminostilbene, which has already been mentioned in Example 1, is obtained.

Example 6

19.3 parts of iminostilbene are dissolved in 200 parts by volume of abs. benzene and 4 parts of sodium amide in 30 parts by volume of abs. benzene are added dropwise at 45° while stirring in a nitrogen atmosphere. The reaction mixture is then heated for 2 hours at 75°, then cooled to room temperature, 7 parts by volume of propylenoxide in 7 parts by volume of benzene are added and the whole is stirred for another 15 hours in a nitrogen atmosphere. Water is then added to the reaction mixture, the benzene phase is separated, washed several times with water, dried and concentrated in the vacuum. The residue is the crude 5-(β-hydroxylpropyl)-iminostilbene.

11.5 parts of methane sulphonic acid chloride are added to the residue, 5-(β-hydroxy-propyl)-iminostilbene, in 40 parts by volume of pyridine, the addition being made at 0°. The reaction mixture is left to stand for an hour at room temperature. 23 parts of pyridine hydrochloride are then added in order to convert the reaction product, which consists partly of the methane sulphonic acid ester and partly of the chloride of the starting material, into the latter, the whole is left to stand for 15 hours at room temperature and is then finally heated for 1½ hours at 80°. After cooling, the 5-(p-chloro-propyl)-iminostilbene formed is precipitated by diluting with water. It is heated with 100 parts by volume of 33% ethanolic dimethylamine solution in a closed vessel for 3 hours at 90°. After cooling, water is added, the reaction is made acid to Congo red with diluted hydrochloric acid, the mixture is shaken with ether and the 5-(β-dimethylamino-propyl)-iminostilbene is precipitated with caustic soda lye. The crude base is taken up in ether and worked up as described in Example 4.

Example 7

A solution of 12.6 parts by volume of dimethyl sulphate in 25 parts by volume of benzene is added dropwise at 50–60° C. to 10.6 parts of 5-(β-amino-ethyl)-iminostilbene and 15 parts of anhydrous, pulverized sodium carbonate in 75 parts by volume of benzene, and the reaction mixture is then heated for 4–5 hours at 60°. It is then cooled, about 100 parts of water and 50 parts by volume of ether are added, the organic phase is separated and extracted with diluted hydrochloric acid. On acidifying the hydrochloric acid extract, crude 5 - (β - dimethylamino - ethyl) - iminostilbene is obtained which can be purified by distillation in a high vacuum or can be converted into the hydrochloride by treating with ethanolic hydrogen chloride solution.

Example 8

39 parts of iminostilbene are dissolved in 150 parts by volume of benzene and 50 parts by volume of toluene. 40 parts of sodium amide in toluene are added dropwise at 40–50° while stirring and introducing nitrogen. On completion of the addition of sodium amide, the whole is refluxed for an hour, cooled to −15° and 20 parts of α-bromopropionic acid dimethylamide and 20 parts of toluene are added dropwise in such a manner that the reaction temperature is always kept between −10 to 8°. The reaction mixture is then stirred for one hour at room temperature and then refluxed for three hours. It is cooled, the precipitated sodium bromide is filtered off under suction and the filtrate is distilled in a high vacuum in a Hickmann flask. 5-(α-dimethylcarbamyl)-iminostilbene is obtained.

30 parts of lithium aluminum hydride are suspended in 2000 parts by volume of abs. ether and 240 parts of the amide obtained above in 720 parts by volume of tetrahydrofurane are added dropwise within 1½ hours while stirring, whereupon the temperature rises to about 38°. The reaction mixture is then refluxed for three hours, cooled to −10° and water is added.

The ethereal phase is extracted 4 to 5 times with 200 parts by volume of 2 N-hydrochloric acid each time. The acid extracts are made alkaline with concentrated caustic soda lye and the oil which precipitates is taken up in ether.

The ethereal solution is dried over sodium sulphate, the solvent is distilled off and the residue is distilled in a Hickmann flask. 5-(α-dimethylaminomethyl-ethyl)-iminostilbene is obtained.

Example 9

18.3 parts of iminostilbene are dissolved in 490 parts of anhydrous benzene and 18.6 parts of γ-diethylamino-n-butyl chloride in 150 parts by volume of anhydrous benzene are added.

A suspension of 4 parts of sodium amide in toluene is added dropwise at 55° while stirring well and the whole is then refluxed for 15 hours. Water is then added to the reaction mixture and the basic portions are removed from the benzene phase by extracting three times with diluted hydrochloric acid. The combined extracts are made alkaline and ethered out, and the ethereal solution is dried over potassium carbonate and concentrated. The residue is distilled in high vacuum whereupon the 5-(γ-diethylamino-n-butyl)-iminostilbene passes over at 185–190° under 0.5 mm. pressure.

The hydrochloride prepared with alcoholic hydrochloric acid melts at 193–195° (from acetone).

On using γ-pyrrolidyl-n-butyl chloride (B.P.$_{13}$ 82–87°), 5 - (γ - pyrrolidyl - n - butyl) - iminostilbene (B.P.$_{0.35}$ 206–208°), and on using γ-dimethylamino-n-butyl chloride, 5 - (γ - dimethylamino - n - butyl) - iminostilbene (B.P.$_{0.025}$ 172–176°) are obtained in an analogous manner.

Example 10

12 parts of iminostilbene are dissolved in 350 parts by volume of anhydrous benzene and 9.5 parts of γ-pyrrolidyl-β-methylpropyl chloride (B.P.₁₆ 95°) in 15 parts by volume of anhydrous benzene are added.

A suspension of 2.75 parts of sodium amide in toluene is added at 60° while stirring well and the mixture is stirred for 5 hours at 60°. The whole is then refluxed for 13 hours, whereupon water is added to the reaction mixture and the basic portions are removed from the benzene by extracting three times with diluted hydrochloric acid. The combined extracts are made alkaline and ethered out and the ethereal solution is dried over potassium carbonate and concentrated. The residue is distilled in a high vacuum whereupon the 5-(γ-pyrrolidyl-β-methylpropyl)-iminostilbene passes over at 165° under 0.06 mm. pressure.

The hydrochloride prepared with alcoholic hydrochloric acid melts at 108–115° (from acetone).

On using γ - diethylamino - β - methylpropyl chloride (B.P.₁₇ 53°), the 5-(γ-diethylamino-β-methylpropyl)-iminostilbene (B.P.₀.₀₃ 164.5°) is obtained in an analogous manner.

*Example 11*

9.65 parts of iminostilbene are dissolved in 300 parts by volume of anhydrous toluene and 7.5 parts of γ-dimethylamino-β-methylpropyl chloride in 50 parts by volume of anhydrous toluene are added.

A suspension of 2 parts of sodium amide in toluene is added dropwise at 60° while stirring well, and the mixture is then refluxed for 12 hours. Water is then added to the reaction mixture and the basic portions are removed from the separated toluene phase by extracting three times with diluted hydrochloric acid. The combined hydrochloric acid extracts are made alkaline and ethered out, and the ethereal solution is dried over potassium carbonate and concentrated. The residue is distilled in the high vacuum whereupon 5-(γ-dimethylamino-β-methylpropyl)-iminostilbene passes over at 158–161° under 0.025 torr. The base crystallises from acetone in the form of yellow microcrystals which melt at 77–78°.

The hydrochloride prepared with alcoholic hydrochloric acid melts at 202–203° (yellow prisms from acetone).

The above named basically substituted iminostilbenes (Ia) according to the present invention can be used e.g. for the treatment of certain mental disorders such as mental depressions and schizophrenia. They are administered perorally or by injection in the form of tablets or coated tablets containing 20–30 mg. of active ingredient or in ampoules containing 20–30 mg. respectively. The dosage ranges from 3 to 10 tablets per day or 3 to 5 ampoules per day respectively for some weeks, whereupon a maintenance dose of 1 to 5 tablets is sufficient.

This application is a continuation-in-part of application Serial No. 695,244, filed November 8, 1957, entitled Process for the Production of New Azepines, and Serial No. 695,231, filed November 8, 1957, entitled N-Aminoalkyl Derivatives of Azepines; both of which applications are now abandoned.

Having thus disclosed the invention, what is claimed is:

1. A process for the production of a 5-dibenzo[b,f]-azepine of the formula:

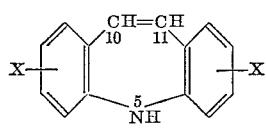

wherein X represents a member selected from the group consisting of hydrogen, chlorine and methyl, which comprises treating a 10,11-dihydro-5-dibenzo[b,f]-azepine of the formula:

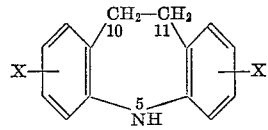

with an acylating agent selected from the group consisting of acetyl chloride, propionyl chloride, chloroformic acid methyl ester and chloroformic acid ethyl ester, subjecting the resultant 5-acyl derivative to the action of a halogen-yielding compound selected from the group consisting of N-bromosuccinimide, N-chlorosuccinimide, N-bromophthalimide and N-bromoacetamide, treating the resultant corresponding 5-acyl-10-halogen-10,11-dihydro - 5 - dibenzo[b,f]azepine with a dehydrohalogenating agent selected from the group consisting of a tertiary organic base and an alkali lye and subjecting the compound obtained to hydrolysis by heating with an alkali lye.

2. A process according to claim 1 wherein the halogen-yielding compound is N-bromo-succinimide.

3. Process according to claim 1 wherein the 5-acyl-10-halogen-10,11-dihydro - 5 - dibenzo[b,f]azepine is simultaneously treated with the dehydrohalogenating agent and subjected to hydrolysis.

4. A 5-dibenzo[b,f]azepine of the formula:

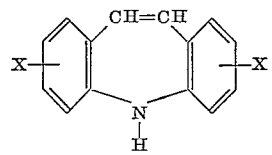

wherein X represents a member selected from the group consisting of hydrogen and chlorine.

5. A compound of the formula

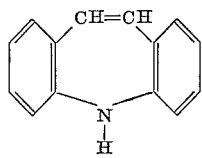

6. A compound of the formula

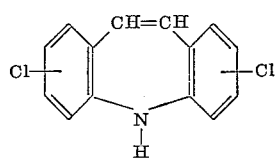

7. A compound of the formula

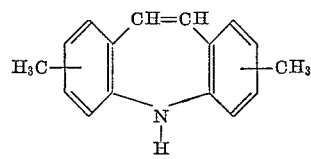

8. 3,7-dichloro-iminostilbene.

9. A member selected from the group consisting of an N-aminoalkyl derivative of an azepine corresponding to the formula:

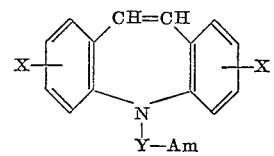

and salts thereof with non-toxic acids, wherein

X represents a member selected from the group consisting of hydrogen, halogen and methyl,
Y represents an alkylene radical having at least two and at most six carbon atoms and at least two and at most four bridging members between N and Am, and
Am represents a member selected from the group consisting of lower dialkylamino, 1-pyrrolidino and 1-piperidino.

10. 5-(γ-dimethyl-amino-propyl)-iminostilbene.

11. 5-(γ-dimethyl - amino - propyl) - 3,7 - dichloro-iminostilbene.

12. 5-(β-pyrrolidino-ethyl)-iminostilbene.

13. 5-(γ-dimethylamino-propyl) - iminostilbene hydrochloride.

14. 5-(γ-dimethylamino - propyl)-3,7-dichloro - iminostilbene hydrochloride.

15. 5-(β-pyrrolidinoethyl) - iminostilbene hydrochloride.

No references cited.